United States Patent [19]

Akao et al.

[11] 4,411,945
[45] Oct. 25, 1983

[54] FRICTION SHEETS

[75] Inventors: Mutsuo Akao; Haruo Furuta, both of Minami-ashigara, Japan

[73] Assignee: Fuji Photo Film Co., Ltd., Kanagawa, Japan

[21] Appl. No.: 247,030

[22] Filed: Mar. 24, 1981

[30] Foreign Application Priority Data

Mar. 24, 1980 [JP] Japan ................................. 55-37320

[51] Int. Cl.³ .......................... B32B 5/16; B32B 27/08
[52] U.S. Cl. ..................................... 428/216; 428/328; 428/461; 428/463; 428/451; 428/141; 428/409; 428/514; 428/516; 428/508; 428/509; 428/520; 428/910; 428/694; 428/695; 428/900; 428/408; 428/906; 264/290.2; 264/DIG. 73
[58] Field of Search ............... 428/461, 408, 463, 516, 428/514, 508, 509, 910, 520, 216, 334, 451, 141, 900, 694, 695, 409, 328; 264/290.2, DIG. 73

[56] References Cited

U.S. PATENT DOCUMENTS

| | | | |
|---|---|---|---|
| 3,055,784 | 9/1962 | Roedel | 428/516 X |
| 3,271,229 | 9/1966 | Grabovez | 428/141 |
| 3,496,061 | 2/1970 | Freshour et al. | 428/516 X |
| 3,738,904 | 6/1973 | Ikeda et al. | 264/290.2 X |
| 3,958,064 | 5/1976 | Brekken et al. | 428/336 |
| 4,147,291 | 4/1979 | Akao et al. | 428/516 X |

FOREIGN PATENT DOCUMENTS 2060488  5/1981  United Kingdom ................ 428/516

*Primary Examiner*—P. Ives
*Attorney, Agent, or Firm*—Sughrue, Mion, Zinn, Macpeak and Seas

[57] ABSTRACT

A friction sheet is described consisting of a single layer or a laminated layer comprising an at least uniaxially oriented high density polyethylene film having a density of at least 0.94 g/cm³.

28 Claims, 10 Drawing Figures

FRICTION SHEETS

BACKGROUND OF THE INVENTION

This invention relates to a low friction sheet for use with a tape roll. By the term "tape roll" as used in this invention is meant long, flexible, band-like members (also referred to simply as "tapes"), such as magnetic tapes, e.g., video tapes, audio tapes, etc., and movie films, e.g., Single 8, Super 8, etc., which are wound in the form of roll.

Tape roll materials are typically placed in a case, usually referred to as a cassette, magazine, or cartridge, and wound or rewound in the inside thereof. During such winding or rewinding, the friction between the tape roll and the internal surface of the case may prevent the tape from winding smoothly. In general, therefore, a low friction member, referred to as a friction sheet is placed fixedly or rotatably between the internal surface of the case and the tape roll.

This friction sheet, therefore, is required to have a low coefficient of friction, have good abrasion resistance and dimensional stability, and furthermore, may be desired to have static electrification-preventing properties.

Friction sheets heretofore known include a fluorine resin sheet, silicone materials, wax coated paper, a sheet as disclosed in Japanese Patent Application (OPI) No. 145482/75, which is prepared by incorporating a fluorine compound into the surface of a thermoplastic film, and a sheet as disclosed in Japanese Utility Model Publication No. 2858/68, which is prepared by coating at least one of wax, low molecular weight polyethylene and a sodium salt of alkyl sulfate onto the surface of a paper.

Such friction sheets, however, have not been completely satisfactory with respect to abrasion resistance and surface stability. Those sheets containing fluorine have the disadvantage that their production costs are high because their moldability is poor and the materials per se are expensive.

Furthermore, friction sheet known in recent years includes a sheet composed of polyethylene film, wherein the polyethylene has a molecular weight of at least several million, and calls an ultra-high molecular weight polyethylene. The moldability of ultra-high molecular weight polyethylene is extremely poor due to the ultra-high molecular weight. Therefore, the friction sheets are prepared by at first obtaining a molding in the form of rod of which section perpendicular to longitudinal direction of the molding is a shape desired for the objective friction sheets; and then cutting the molding into round slices in a thickness desired for the objective friction sheets.

Such friction sheet, however, also has the disadvantage that its production cost is extremely high (about 10 times higher than the production cost of friction sheet of the present invention) because the method for preparing the friction sheets is complicated.

According to the above method, the ultra-high molecular weight polyethylene film is not oriented.

SUMMARY OF THE INVENTION

The object of this invention is to provide a novel friction sheet which is free from the above described defects of the prior art friction sheets; i.e., the friction sheet should have a low coefficient of friction and good abrasion resistance and surface stability, and furthermore which can be prepared at low cost.

It has been found that the above object can be attained by using a single layer or laminated layer of an at least uniaxially oriented high density polyethylene film which has a density of at least 0.94 g/cm$^3$.

DETAILED DESCRIPTION OF THE INVENTION

Hereinafter this invention will be explained in more detail by referring to the accompanying drawings.

Figure 1:
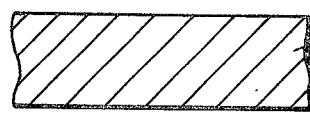
FIGS. 1 and 2 each represents a sectional view of a single layer friction sheet according to this invention.
Figure 6:
FIGS. 3 to 10 each represents a sectional view of a laminated layer friction sheet according to this invention.
Figure 2:
Figure 7:
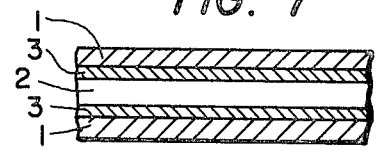
Figure 3:
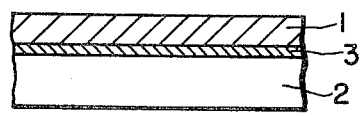
Figure 8:
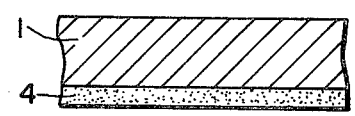
Figure 4:
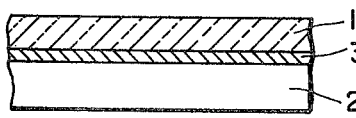
Figure 9:
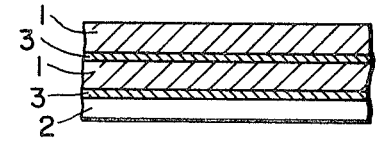
Figure 5:
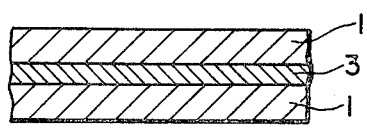
Figure 10:
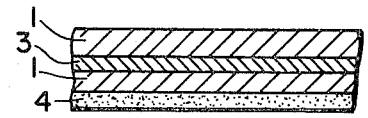

FIGS. 1 and 2 each represents a sectional view of a single layer friction sheet of this invention. Friction sheet 1 is a sheet consisting of a polyethylene film which has a density of at least 0.94 g/cm$^3$ and which has been subjected to at least uniaxial molecular orientation. The thickness of the friction sheet 1 is typically from about 30$\mu$ to 120$\mu$, and preferably from about 50$\mu$ to 100$\mu$. A friction sheet 1a shown in FIG. 2 is prepared by providing the friction sheet 1 with electrification-preventing properties, as described in more detail below, depending on the purpose for which the friction sheet is used.

The at least uniaxial molecular orientation may be performed in any of longitudinal, lateral and diagonal directions of the high density polyethylene film. For the purpose of at least uniaxial molecular orientation generally well known methods (i.e., i) a method of stretching a film in the at least uniaxial direction; (ii) a method of extruding the raw material from the narrow orifices while putting pressure; and (iii) a method of combining the two methods described above) can be used.

For example, when the high density polyethylene film is produced by the T-die method or inflation method, the orifice is narrowed, the film is wound at a higher rate than the extrusion rate, the film is brought into contact with a rotary mandrel (to be oriented), the film is cooled gradually, the blow rate is increased or the film formed is stretched to achieve the at least uniaxial molecular orientation. In the case of the extrusion method, the molecular orientation can be performed in an analogous manner to that described above.

Preferred stretching rate is 1.5 to 20 times and more preferred stretching rate is 2.5 to 6 times.

The films are, for example, classified in a non-oriented film, an uniaxial oriented film, a biaxial oriented film etc. Among these films, the at least uniaxial oriented film are preferred for the friction sheets according to this invention due to improving the friction sheets in physical strength, especially tear strength, and the uniaxial oriented film is more preferred.

The oriented direction is not effective for a sliding property or a surface strength. It is, however, desired that one of oriented axes of the friction sheet is parallel or perpendicular to a running direction of the magnetic tapes, for the purpose of preventing a curl of the friction sheets.

The T-die method and inflation method described above is as follows:

(i) The T-die method refers to a method preparing a flat film by extruding a resin from narrow orifice.

The name of this method originates in the form of the die.

(ii) The inflation method refers to a method preparing a film having a form of pipe by extruding a resin from a circular orifice. The film extruded as pipe is expanded by air supplied from a center part of the circular orifice; controlled in a desired size; put into a pair of pinch rolls; and wound.

In order to provide the friction sheet 1 with electrification-preventing properties to form the friction sheet 1a, a method of incorporating known antistatic agents, such as carbon black and surface active agents (anionic, nonionic, cationic and amphoteric surface active agents which are available on the market), into the high density polyethylene.

The method for incorporating the antistatic agent is, for example, as follows:

(i) A method containing covering polyethylene pellets with a desired amount of the antistatic agents, confusing a melt of the pellets obtained with heating, and again preparing the melt in a form of pellets.

(ii) A method containing preparing pellets containing the antistatic agents in the analogous manner as the method described above, and mixing pellets containing no antistatic agent with pellets containing the antistatic agents in a desired ratio to prepare a mixture.

(iii) A method containing simply mixing polyethylene pellets with a desired amount of the antistatic agents (without preparing pellets) to prepare a mixture.

A polyethylene sheet is prepared from the resulting polyethylene pellets or the mixture described above.

Additionally, a method of dispersing metal powder, such as aluminum powder, aluminum paste, zinc powder, etc., into the high density polyethylene film or the adhesive layer can be employed. The aluminum paste is prepared in a paste form by adding white spirit and a small amount of stearic acid during production of aluminum powder by the ball mill method.

As can be seen from the example described hereinafter, the friction sheets 1 and 1a are low in coefficient of friction and excellent in abrasion resistance and dimensional stability as compared with the conventional friction sheets. Particularly, since the friction sheet 1a has electrification-preventing properties as well as the above described excellent properties, it can efficiently be used as a friction sheet in cases where prevention of electrification is required in the course of winding or rewinding the tape roll, such as a friction for use in a cassette tape or 8 mm movie film. The reason for this is that where the friction sheet for a cassette tape possesses electrification properties (that is, becomes statically charged), magnetic powder and other dust attach onto the tape, resulting in deterioration of the sound characteristics of the tape. In the case of the friction sheet for use in, e.g., an 8 mm movie film, formation of static marks due to static electricity, etc., as well as attachment of photographic emulsion powder and other dust, significantly deteriorate the image quality of the film.

Furthermore, the friction sheets 1 and 1a have the advantage that their production cost is very inexpensive as compared with the conventional friction sheets.

Although the above explanation has been given with respect to the single layer friction sheet, this invention is not limited thereto. That is to say, this invention includes within the scope thereof those laminated layers prepared by combining a single layer friction sheet 1 or 1a with other layers. Furthermore, lubricants such as silicone materials such as dimethyl polysiloxane, etc., paraffin, higher alcohols, aliphatic acids, aliphatic acid salts, etc. can be added to the at least uniaxially orientated high density polyethylene film 1 or 1a, or the surface of the at least uniaxially orientated high density polyethylene film 1 or 1a can be made irregular or uneven in order to further improve the characteristics of the friction sheet.

In order that the surface of polyethylene film is made irregular or uneven (i.e., rough, textured, granular, silken, vertically striated, horizontally striated, matted, etc.), the embossing roll or plate on which the irregular or uneven pattern is sculptured are generally used.

FIGS. 3 to 10 each indicates a structure of a laminated layer friction sheet, wherein 2 is a flexible sheet layer, 3 is an adhesive layer, and 4 is an aluminum vapor-deposited layer. The flexible sheet layer 2 is a sheet-like member having flexibility. For the formation of the adhesive layer 3, thermoplastic resins such as low density polyethylene as well as known adhesives such as a heat-sensitive adhesive, a pressure-sensitive adhesive, etc., can be used.

When at least a pair of high density polyethylene films oriented at least uniaxially are affixed, it is preferred that one of the orientation axes or stretched axes of one of the films is crossed at angle of 45° to 90° with one of orientation axes stretched axes of another film.

These laminated layer friction sheets are often more useful than the above-described single layer sheets, since they have not only the above-described characteristics, but are furthermore improved in physical strength, especially tear strength. Friction sheets as shown in FIGS. 5, 6, 7, 9 and 10 in which two 1 or 1a type of films oriented at least uniaxially are laminated in such a manner that the orientation axes are crossed with each other are also improved, particularly in tear strength. Since the thickness of the sheet layer 1 or 1a can be reduced in such laminated layer embodiments, there is often almost no difference with respect to cost even though the layer structure becomes slightly complicated.

Preferred examples of the materials comprised by each layer composed of the friction sheets of this invention, and in addition, the purposes of incorporating the materials thereto are set forth below, but the present invention should not be construed as being limited to these examples.

(i) The flexible sheet layer comprises at least a material selected from an aluminum foil, paper, cellophane, a plastic film such as polyethylene film, polypropylene film, etc., cloth, etc., for the purposes of (a) preventing a curl, (b) increasing a physical strength and a thickness, (c) decreasing a cost and (d) increasing an antistatic property (in case of the aluminum foil).

(ii) The adhesive layer comprises at least a material selected from polyethylene, a co-polymer of ethylene-ethyl acrylate, a cop-polymer of ethylenevinyl acetate, Surlin (trade name registered by DuPont) for the purpose of adhesion.

(iii) The aluminum vapor-deposited layer comprises at least a material selected from an aluminum vapor-deposited material for the purpose of decreasing a cost.

EXAMPLE

A 10µ thick silicone coating film layer was impregnated on the surface of a paper support to which carbon black had been impregnated in an amount of 5.0% by weight based on the weight of the paper, to form a conventional 100µ thick friction sheet. On the other hand, 5% by weight aluminum paste was added to high density polyethylene having a density of 0.96 g/cm³ which had been subjected to molecular orientation in a longitudinal direction to form a 70µ thick friction sheet of this invention, as illustrated in FIG. 2.

A comparison was made between the conventional friction sheet and the friction sheet of this invention with respect to suitability of the physical properties and production costs according to the following evaluation methods:

Sliding Properties

A piece of each of the above friction sheets was cut off and adhered onto the bottom surface of a block having a predetermined weight, and another piece was cut off and adhered onto a slope. The block was then placed on the slope, and by changing the angle of the slope, an angle at which the block began to slide was measured.

Surface Strength

Measured according to JIS Z-0200-1976.

Abrasion Resistance

A piece of each friction sheet was placed in a cassette as a friction sheet for a cassette tape, and after repeating the winding and rewinding of the tape in the cassette 30 times, the coarseness of the sheet surface was observed.

Prevention of Electrification

The amount of charge was determined by driving an endless tape on which a sample film is affixed at a feeding speed of 2 m/min. around a pair of rolls positioned vertically, pinching the endless tape under a load of 500 g, the upper one being made of nylon and the other made of SUS such that the tape is fed and measuring the amount of static charge generated.

Dimensional Stability

The change in dimension due to a change in moisture (from 30% RH (relative humidity) to 90% RH at 20° C.) was measured with a scale.

Cost Comparison

A comparison was made between the production costs per unit area of the friction sheets.

The results are shown in Table 1.

TABLE 1

|  | Conventional Friction Sheet | Friction Sheet of This Invention |
| --- | --- | --- |
| Sliding Properties | Acceptable for practical use (18°) | Excellent (11°) |
| Surface Strength | Acceptable for practical use (18°) | Excellent (11°) |
| Abrasion Resistance | Acceptable for practical use (18°) | Excellent (11°) |
| Prevention of Electrification (V) | 500 | 100 |
| Dimensional Stability | 500 (0.7%) | Particularly Excellent (0%) |
| Ratio of Cost | 100 | 75 |

As described above, the friction sheet of this invention is low in coefficient of friction and excellent in abrasion resistance, dimensional stability and prevention of electrification, and furthermore can be produced at low cost.

While the invention has been described in detail and with reference to specific embodiment thereof, it will be apparent to one skilled in the art that various changes and modifications can be made therein without departing from the spirit and scope thereof.

What is claimed is:

1. A laminated friction sheet, comprising:
   a first layer of a uniaxially oriented high density polyethylene film having a density of at least 0.94 g/cm³;
   a second layer of a uniaxially oriented high density polyethylene film having a density of at least 0.94 g/cm³, connected to the first layer by an adhesive layer positioned between said first and second layer.
2. A friction sheet as in claim 1 wherein said first and second high density polyethylene film is oriented uniaxially by a stretching.
3. A friction sheet as in claim 1 wherein said first and second high density polyethylene film is oriented biaxially by a stretching.
4. A friction sheet as in claim 1 wherein said first and second high density polyethylene film is oriented by a biaxial stretching.
5. A friction sheet as in claim 2 or 3 wherein the stretching rate is 1.5 to 20 times.
6. A friction sheet as in claim 2 or 3 wherein the stretching rate is 2.5 to 6 times.
7. A friction sheet as in any of claims 2, 3, 4 or 1 wherein the antistatic agents are incorporated into said high density polyethylene.
8. A friction sheet as in any of claims 2, 3, 4 or 1 wherrein silicone material or paraffin is incorporated into said high density polyethylene.
9. A friction sheet as in claim 1 wherein said high density polyethylene film is oriented by a stretching.
10. A friction sheet as in claim 1 wherein the adhesive layer comprises an ethylene-ethyl acrylate copolymer.
11. A friction sheet as in claim 1 wherein aluminum powder is incorporated into said adhesive layer.
12. A laminated friction sheet, as claimed in claim 1, wherein said first layer of uniaxially oriented film crosses said second layer of said uniaxially oriented film at an angle of 40° to 90°.
13. A laminated friction sheet, as claimed in claim 1, wherein aluminum paste is incorporated into said adhesive layer.
14. A laminated friction sheet, as claimed in claim 1, wherein said first and second layers have a thickness of about 30µ to 120µ;
15. A laminated friction sheet, as claimed in claim 14, wherein said thicknesses are about 50µ to 100µ.
16. A laminated friction sheet, as claimed in claim 1, further comprising a lubricant selected from the group consisting of silicone materials, paraffin, higher alcohols, aliphatic acids, or aliphatic acid salts.

17. A laminated friction sheet, as claimed in claim 1, further comprising a metal powder disposed in said polyethylene, wherein said metal powder is selected from the group consisting of aluminum powder, aluminum paste, or zinc powder.

18. A laminated friction sheet, as claimed in claim 1, wherein a surface of said first and second layers is made irregular or uneven.

19. A laminated friction sheet, as claimed in claim 1, further comprising:
carbon black dispersed on the surface of said friction sheet.

20. A laminated friction sheet, comprising:
a first flexible sheet layer; and
a layer of a uniaxially oriented high density polyethylene film having a density of 0.94 g/cm$^3$, connected to said first flexible sheet layer by an adhesive layer positioned between said first flexible sheet layer and said uniaxially oriented high density polyethylene film.

21. A laminated friction sheet, as claimed in claim 20, further comprising:
a second layer of a uniaxially oriented high density polyethylene film having a density of 0.94 g/cm$^3$, connected to said first flexible sheet layer by an adhesive layer positioned between said first flexible sheet layer and said film.

22. A laminated friction sheet, as claimed in claim 20, further comprising:
a second of a uniaxially oriented high density polyethylene film having a density of 0.94 g/cm$^3$, connected to said first layer by a second adhesive layer positioned between said first layer and said second layer of polyethylene film.

23. A laminated friction sheet, as claimed in claim 20, further comprising:
an aluminum vapor-deposited layer positioned on a surface of said flexible sheet layer.

24. A laminated friction sheet, as claimed in claim 20, further comprising an aluminum vapor-deposited layer positioned on a surface of said first layer of uniaxially oriented high density polyethylene film.

25. A friction sheet as in claim 20 wherein said high density polyethylene film is oriented by a stretching.

26. A friction sheet as in claim 20 wherein said flexible sheet layer comprises at least a material selected from an aluminum foil, paper, cellophane, polyethylene film and polypropylene film.

27. A friction sheet as in claim 20 wherein said adhesive layer comprises an ethylene-ethyl acrylate copolymer.

28. A friction sheet as in claim 20 wherein the antistatic agents are incorporated into said high density polyethylene.

* * * * *